United States Patent [19]

Beddoe et al.

[11] Patent Number: 4,734,843

[45] Date of Patent: Mar. 29, 1988

[54] ELECTRICAL POWER CONTROL SYSTEMS

[75] Inventors: Stanley Beddoe, Hampshire; Robert Ireland, Wiltshire, both of England

[73] Assignee: Plessey Overseas Limited, Ilford, England

[21] Appl. No.: 19,896

[22] Filed: Feb. 27, 1987

[30] Foreign Application Priority Data

Feb. 28, 1986 [GB] United Kingdom ............... 8605073

[51] Int. Cl.$^4$ .............................................. H02M 7/10
[52] U.S. Cl. ......................................... 363/50; 361/1; 361/46; 361/42
[58] Field of Search ............... 363/56, 50; 361/1, 42, 361/46, 47, 48, 49, 50

[56] References Cited

U.S. PATENT DOCUMENTS 3,626,248  12/1971  Bartlett et al. ........................ 361/1
4,591,941   5/1986  Gruchalla et al. .................... 361/42

Primary Examiner—Patrick R. Salce
Assistant Examiner—Judson H. Jones
Attorney, Agent, or Firm—Michael F. Oglo; Julian C. Renfro

[57] ABSTRACT

A power control system for the remote control of one or more remote power supply circuits in which a power controller which comprises means for producing an a.c. control signal which is arranged to be transmitted over a single pair of control conductors forming a part of a d.c. isolated control link to remote power supply circuit for the operation thereof, in which variable impedance switching means at the remote power supply circuit modifies the impedance reflected back over the control link to the power controller in accordance with the condition of the power supply switching circuit and in which detector means in the power controller senses changes in the impedance of the variable impedance switching circuit and accordingly provides an indication of the state of the remote power supply circuit.

5 Claims, 1 Drawing Figure

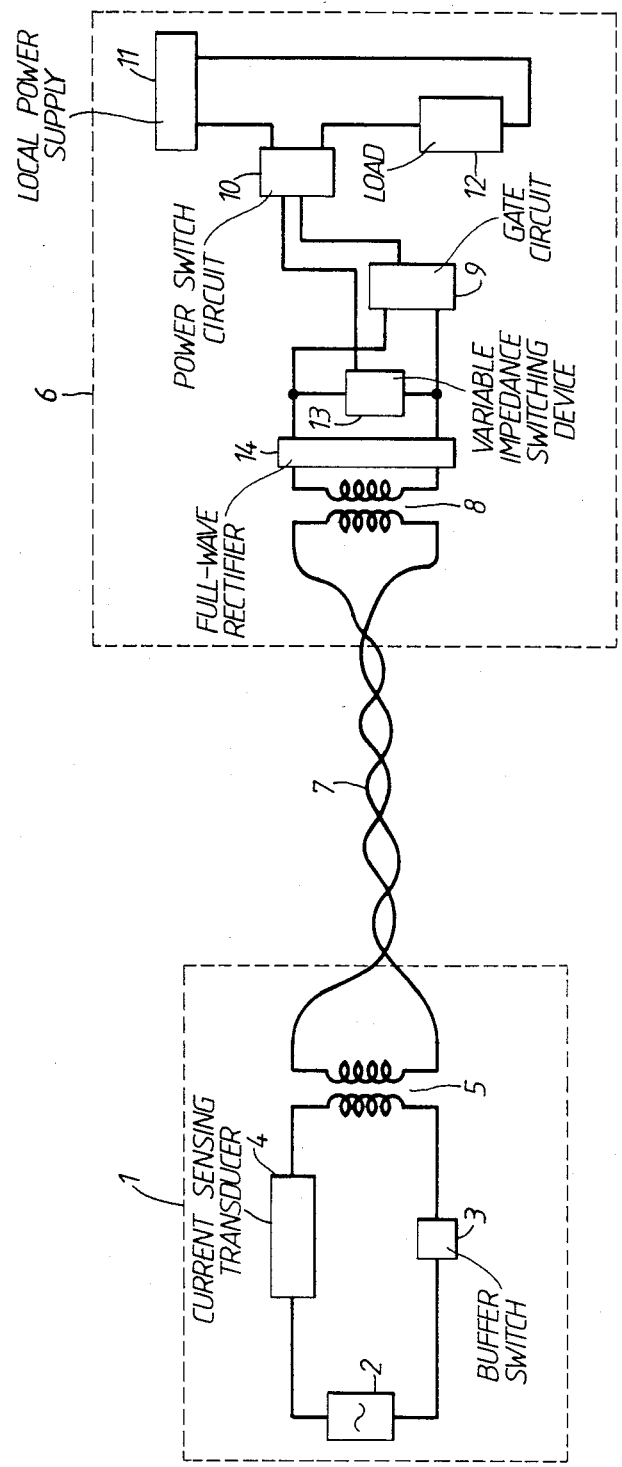

ELECTRICAL POWER CONTROL SYSTEMS

This invention relates to electrical power control systems and relates more specifically to such systems of the kind in which one or more remote power supply switching circuits located respectively in close proximity to the electrical loads to be controlled are thereby operatively controlled and/or monitored from a remote power controller.

According to the present invention there is provided a power control system for the remote control of one or more remote power supply circuits, in which a power controller provides means for producing an a.c. control signal which is arranged to be transmitted over a preferably twisted pair of control conductors forming part of a d.c. isolated control link to a remote power supply circuit for the operation thereof, in which variable impedance switching means at the remote power supply circuit modifies the impedance reflected back over the control link to the power controller in accordance with the condition of the power supply switching circuit and in which detector means in the power controller senses changes in the impedance of the variable impedance switching circuit and accordingly provides an indication of the status of the remote power supply circuit.

In carrying out the present invention the a.c. control signal may be provided by an oscillator arranged to be switched on or powered up when operation of the remote power supply circuit is required.

The power supply circuit may include over-current sensing means which cause the power supply circuit to be disconnected under over-current conditions. This will be detected by the variable impedance switching circuit which will accordingly modify the impedance reflected back to the power controller in order to provide an indication that the power is switched off even though the a.c. "power-on" control signal is still being applied over the control link.

By way of example the present invention will now be described with reference to the accompanying single-FIGURE drawing which shows a block schematic diagram of a power control system according to the present invention.

Referring to the drawing the power control system comprises a power controller 1 including an oscillator 2 preferably having a signal frequency exceeding 10 KHz, a buffer switch 3, a current sensing transducer 4 and a balanced transformer 5. The power controller is electrically connected to a remote power supply switching circuit 6 by means of a twisted pair cable 7 which is terminated in the power supply circuit by means of a further balanced transformer 8. The secondary of the transformer 8 is connected to a gate circuit 9 the output from which is arranged to be applied to a power switch circuit 10 for the operation thereof and the consequential connection of a local power supply 11 to a load 12. A variable impedance switching device 13 is connected to the output of a full-wave rectifier 14 connected across the transformer 8. The device 13 is also connected to the power switch circuit 10.

When power is to be supplied to the load 12 the oscillator 2 in the power controller is arranged to be rendered operative by the operation of the switch 3. The a.c. output produced by the oscillator 2 is sensed by the current transducer 4 and is fed through the two balanced transformers 5 and 8 and the twisted pair 7 to the gate circuit 9. The gate circuit 9 operates and the output therefrom causes the power switch circuit 10 to be closed to complete the circuit between the local power supply and the load at the remote power switching location. Operation of the power switch 10 is sensed by the variable impedance switch 13 and it accordingly reacts to reduce its impedance thereby causing a rise in the a.c. current flowing in the primary circuit of the balanced transformer 5. This rise in current is sensed by the current transducer 4 to provide an indication that the remote power supply 11 is operating to supply the load 12.

If, however, the power switch circuit 10 opens due to excess load current being sensed by over-current sensors in the power switch circuit then the variable impedance switch circuit will sense the opening of the power switch and will re-insert the former relatively high impedance across the secondary of the balanced transformer 8. The oscillator current will accordingly fall and this will be detected by the current transducer 4 to produce an indication that the power switch circuit has been tripped due to over-current conditions.

The power switch circuit 10 may also be opened to interrupt the load current by opening switch 3 to disable the oscillator 2.

It will be appreciated that the present invention enables the remote power supply circuit to be controlled from the power controller over a single twisted pair of wires which also serve by changes in the a.c. current levels therein to provide an indication of status of the power switching circuit.

The gate circuit and power switch may be of the MOSFET type which require very little control power from the power controller and the conrolling operation does not require complex data links betwen the power controller and the remote power supply circuit whilst retaining the requisite degree of immunity to force signals (e.g. EMI) by virtue of the twisted pair cable.

As will readily be appreciated, the variable impedance switching circuit may alternatively be connected in series with the gate circuit so that the impedance increases instead of decreasing when the power switch closes.

Moreover, the power conroller may be arranged to control a plurality of remote power supply circuits having individual power switching circuits associated therewith.

We claim:

1. A power control system for the remote control of one or more remote power supply circuits in which a power controller comprises means for producing an a.c. control signal which is arranged to be transmitted over a single pair of control conductors forming part of a d.c. isolated control link to a remote power supply circuit for the operation thereof, in which variable impedance switching means at the remote power supply circuit modifies the impedance reflected back over the control link to the power controller in accordance with the condition of the power supply switching circuit and in which detector means in the power controller senses changes in the impedance of the variable impedance switching circuit and accordingly provides an indication of the state of the remote power supply circuit.

2. A power control system as claimed in claim 1, in which the control link comprises a twisted pair of control conductors.

3. A power control system as claimed in claim 1 or claim 2, in which the d.c. isolation of the power controller and the remote power switching circuit is provided by a pair of balanced transformers.

4. A power control system as claimed in claim 1, in which the power supply circuit includes over-current sensing means which cause the power supply circuit to be disconnected under over-current conditions, such disconnection being detected by the variable impedance switching circuit which will modify the impedance reflected back to the power controller in order to provide an indication that the power is switched off even though the a.c. "power-on" control signal is still being applied over the control link.

5. A power control system as claimed in claim 1, in which the power supply switching circuit is of the MOSFET type requiring very little power from the power controller for its operation.

* * * * *